INVENTOR
OLEG SYZMBER
ATT'YS.

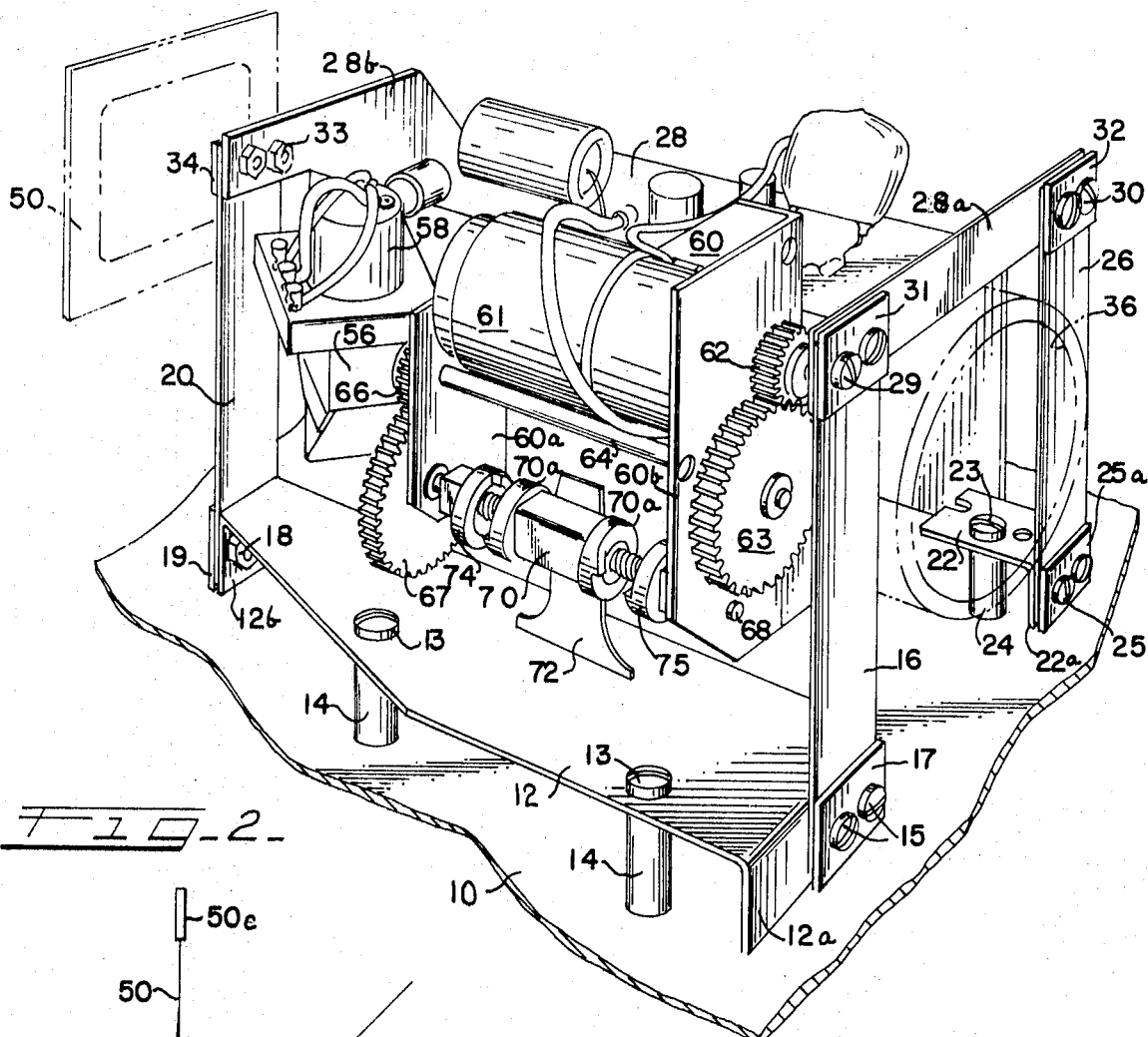

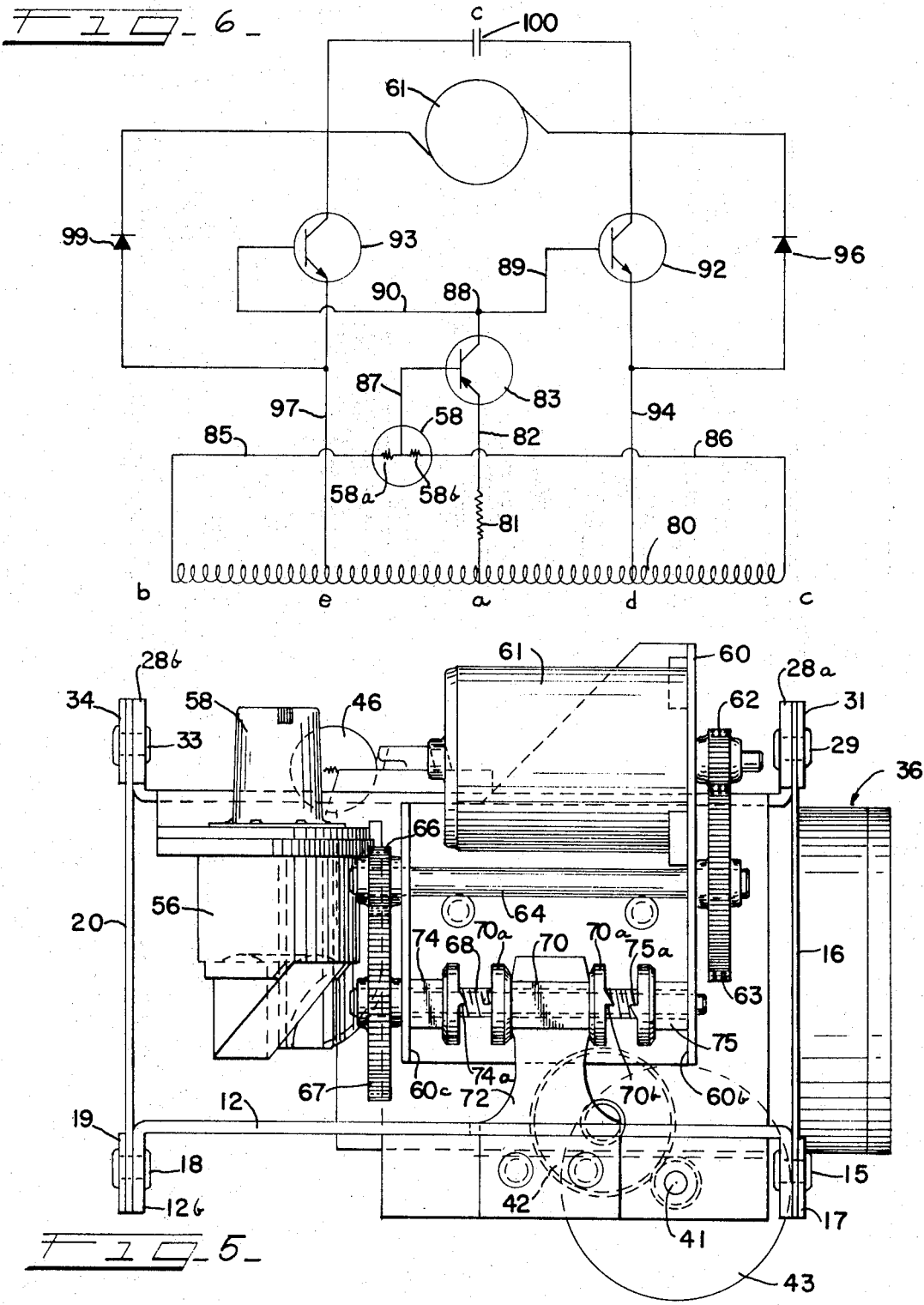

United States Patent Office 3,536,392
Patented Oct. 27, 1970

3,536,392
AUTOMATIC FOCUSING SYSTEM FOR IMAGE PROJECTING DEVICES
Oleg Szymber, Elk Grove, Ill., assignor to GAF Corporation, New York, N.Y., a corporation of Delaware
Filed Apr. 17, 1967, Ser. No. 631,516
Int. Cl. G03b 3/00
U.S. Cl. 353—101                                    12 Claims

ABSTRACT OF THE DISCLOSURE

The objective lens holder of a slide projector is supported by a frame which is shiftably mounted by the projector for allowing movement of the objective lens holder in either direction along the optical axis. All components of the automatic focusing system are carried by the frame for movement therewith. A servomotor is carried by the frame and is associated with a drive mechanism so that energizing of the motor causes shifting movement of the frame in either direction depending on the direction of rotation of the motor. A beam of radiation is directed along a plane for striking the transparency at a point spaced from the optical axis along a line intersecting the latter and being substantially perpendicular to the optical axis and to such plane for determining the average displacement of the transparency from the image focal plane.

BACKGROUND OF THE INVENTION

The present invention has to do with improvements in automatic focusing systems of the type shown in Mitchell Pat. 2,947,215, Shurcliff Pat. 3,037,423, and Stauffer Pats. 3,249,001, 3,249,006 and 3,249,007. These patents show systems for automatically maintaining focusing in image projecting devices, such as slide projectors. Each system includes a bulb for producing a beam of radiation and a lens for focusing the beam on the center of a slide in the projection gate such that the beam is reflected obliquely from the transparency. Another lens focuses the reflected light onto a pair of photoelectric cells. Displacement of the center of the slide, as by buckling, from the plane at the gate causes corresponding displacement of the reflected beam on the photoelectric cells, thereby causing the latter to produce signals. Suitable motive means, responsive to the signals from the photoelectric cells, move the objective lens in one direction or the other to maintain a fixed distance between the objective lens and the center of the slide. This invention has to do with improvements in the aforementioned type of automatic focusing system for improving its operation and for simplifying its construction.

OBJECTS OF THE INVENTION

A primary object of the present invention is the provision of new and unique improvements in an automatic focusing system of the type described.

Another object is to provide a new and improved automatic focusing system in which the objective lens is shifted a distance corresponding to the average displacement or deflection of the transparency.

Still another object of the present invention is the provision of new and improved means for mounting the various components of an automatic focusing system of the type described.

Another object of the present invention is the provision of a unique overriding clutch to limit shifting movement of the objective lens during operation of the automatic focusing system thereby to prevent damage to the drive mechanism thereof.

Still another object of the present invention is the provision of a unique folded optical system in an automatic focusing system of the type described.

These and other objects and advantages of the invention will become apparent from the following specification disclosing a preferred embodiment illustrated in the accompanying drawings.

DESCRIPTION OF THE DRAWINGS

FIG. 1 is a perspective view of an automatic focusing system embodying the present invention;

FIG. 2 is a diagrammatic elevational view showing the relationship between the projector optical axis and the beam of radiation which strikes the transparency for detecting buckling or deflection thereof;

FIG. 5 is an elevation taken along the line 5—5 of FIG. 4; and

FIG. 6 is a diagram of the circuit forming part of the automatic focusing system.

Referring to FIG. 1, the base plate of an image projecting device, such as a slide projector, is fragmentarily illustrated and designated 10. A bracket plate 12 is mounted in spaced parallel relation above the projector base plate by a plurality of screws 13 which extend through spacer sleeves 14. Plate 12 has a down-turned flange 12a at one end thereof. A pair of fasteners 15 mounts the lower end of a vertically disposed, flexible strip 16 between the flange 12a and a small plate 17. The bracket plate 12 has a down-turned flange 12b at the other end thereof mounting one or more fasteners 18 which cooperate with a plate 19 to mount the lower end of a vertically extending, flexible strip 20. Base plate 10 mounts another but smaller bracket plate 22, as by means of a fastener 23 and spacer sleeve 24. This bracket includes a down-turned flange 22a supporting fasteners 25 cooperating with a plate 25a to mount the lower end of a vertically extending, flexible strip 26.

Figure 3:
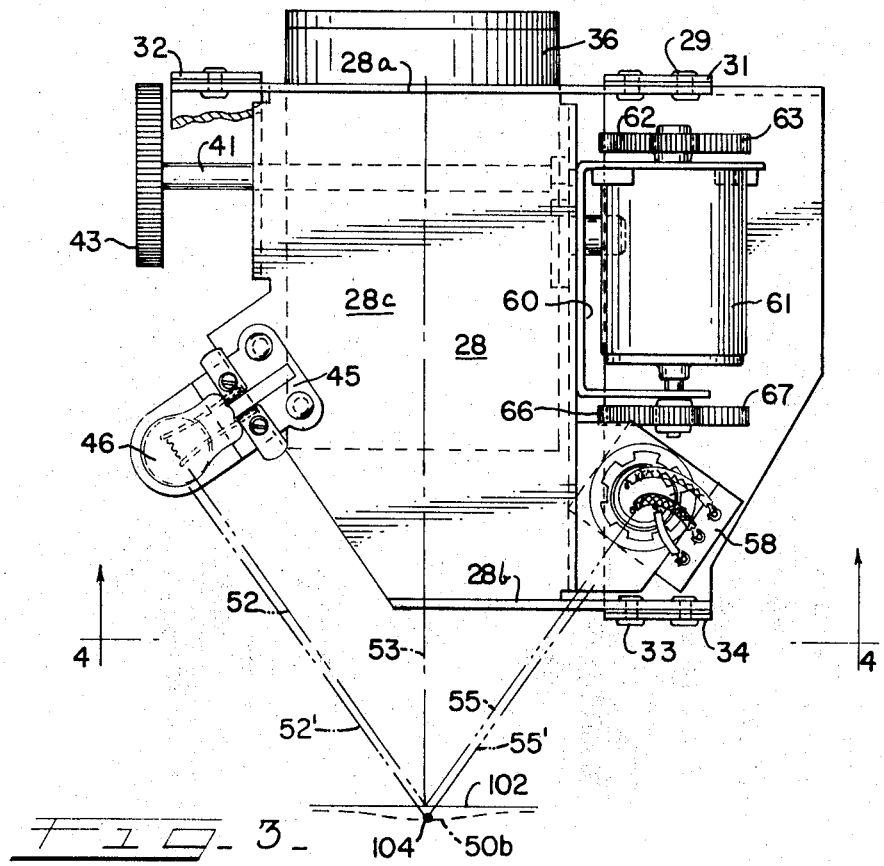
FIG. 3 is a top plan view of the structure shown in FIG. 1 with certain of the electrical components removed.

The flexible strips 16, 20 and 26 serve to mount shiftably a frame plate 28. The frame 28 has a forward, upwardly extending flange portion 28a connected to upper ends of the strips 16, 26 as by means of pairs of fasteners 29, 30 and plates 31, 32, respectively. Frame plate 28 includes rearward, upwardly extending flange portion 28b connected to the upper end of strip 20 by fasteners 33 and a small plate 34.

Figure 4:
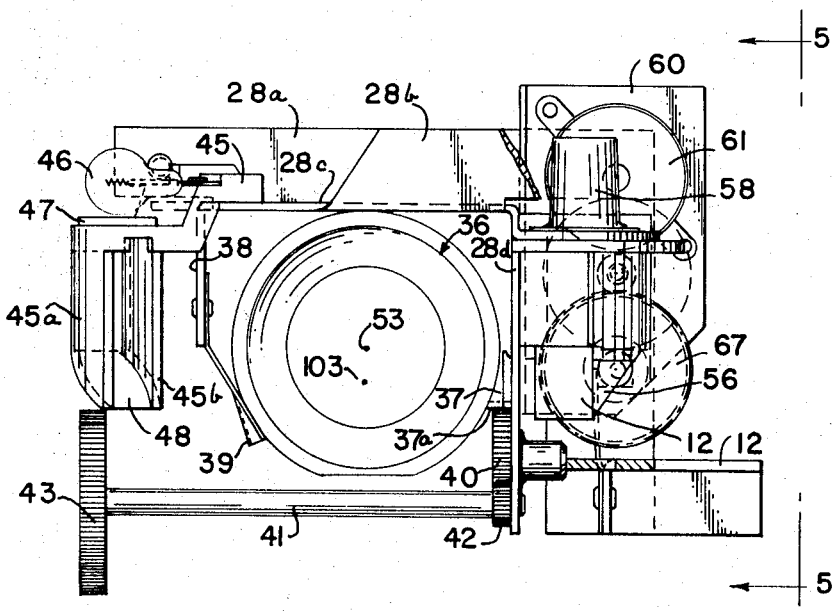
FIG. 4 is an elevation taken along the line 4—4 of FIG. 3 with certain parts being broken away for better illustration of the invention.

As noted in FIG. 4, the frame plate is of right angle cross-section including an upper portion 28c and a side portion 28d. A cylindrical objective lens holder 36 of known construction includes an elongated formation 37 extending axially along one side thereof and having a face in sliding engagement wtih the frame portion 28d. Frame portions 28c mounts a bracket plate 38 which in turn supports a spring arm 39. The spring arm 39 presses against the lens holder 36 holding the upper portion thereof in sliding engagement with the underside of frame portion 28c and the formation 37 in sliding engagement with the frame portion 28d. This construction permits the objective lens holder 36 to be moved axially relative to the frame 28.

The formation 37 includes a gear rack 37a in meshing engagement with a gear 40 mounted on frame portion 28d. A cross shaft 41 has one end thereof rotatably supported by frame portion 28d. A gear 42 is fixed on the shaft 41 and meshes with gear 40. The other end of shaft 41 supports a knob 43. It will be understood that manual rotation of this knob will cause movement of the objective lens holder 36 relative to the frame 28. The associated projector may include power operated means for rotating the shaft 41 thereby to perform what may be called initial focusing. Such power means (not shown) connected to the shaft 41 will accommodate movement thereof due to shifting of the frame 28.

Referring now to FIGS. 3 and 4, it will be seen that the frame 28 mounts a bracket 45 which in turn supports a small bulb 46. This bracket also mounts a lens 47 and a mirror 48, the latter being mounted in an inclined plane by depending bracket portions 45a and 45b. The lens 47 focuses a beam of radiation from the bulb 46 downwardly onto the mirror 48 where it is directed horizontally for striking a transparency 50 mounted by suitable means (not shown) defining the projection gate. This horizontal beam of light is represented in FIG. 3 by numeral 52. Referring to FIG. 4, it will be noted that the beam 52 is contained in a plane in parallel spaced relation with the optical axis, the latter being designated by numeral 53.

The beam of radiation reflected from the transparency 50 is designated 55; this beam, also contained in the aforementioned plane, strikes a combined prism and lens assembly 56 which reflects the beam upwardly and focuses the same on a photoelectric cell assembly 58. The combined prism and lens assembly 56 is supported from the photoelectric cell assembly 58, the latter being suitably mounted from the frame.

The frame plate 28 mounts a bracket plate 60 which in turn carries a small servo or D.C. motor 61. The motor includes a drive shaft mounting a gear 62, this gear being in meshing engagement with a larger gear 63. The gear is mounted on a shaft 64 having opposite ends thereof journaled in apertures in flange portions 60a and 60b of the bracket plate 60. The other end of the shaft 64 carries a small gear 66 in meshing engagement with another gear 67. The gear 67 is mounted on one end of a shaft 68, opposite ends of which are also journaled in bracket plate portions 60a and 60b. It should be apparent that the drive train just explained will cause rotation of the shaft 68 upon energizing of motor 61.

As best noted in FIG. 5, the shaft 68 includes a threaded portion 68a intermediate the ends thereof. Such threaded portion is threadingly received in the central bore of a sleeve 70 having a square external configuration defined by four flat walls. The sleeve also includes annular flanges 70a at respective opposite ends thereof. The bracket plate 12 mounts a vertically extending spring arm 72 which engages any one of the flat walls of the sleeve 70 and which is received between the sleeve flanges 70a. It should be apparent that engagement between the spring 72 and the sleeve 70 prevents axial movement of the latter and permits restrained rotation thereof.

The flanges 70a each include a catch surface 70b. Shaft 68 mounts a pair of catch members 74, 75 for rotation therewith. Catch member 74 includes a catch surface 74a adapted for mating engagement with the adjacent catch surface 70b thereby to cause clockwise rotation of the sleeve 70 (as viewed in FIG. 4) upon corresponding rotation of the catch 74 when these two catch surfaces are in mating engagement. The catch 75 includes a catch surface 75a adapted for mating engagement with the adjacent catch surface 70a. When these two catch surfaces are in mating engagement, rotation of the catch member 75 in a counterclockwise direction (as viewed in FIG. 4) will cause corresponding rotation of the sleeve 70.

FIG. 6 illustrates a circuit for the automatic focusing system of this invention. A source of current for this circuit may be conveniently provided by the secondary winding 80 (approximately 28 volts) of the motor which drives the fan in the associated projecting device. This secondary winding, having ends designated b and c, is center tapped at a by a line 82 in series with a resistor 81, the line 82 being connected to the emitter of a PNP type transistor 83. Photosensitive elements 58a and 58b of the photoelectric cell assembly are connected in parallel with the winding 80 by lines 85, 86. A connection is established between the base of transistor 83 and a common point between photosensitive elements 58a, 58b as by means of a line 87. The collector of transistor 83 is connected to a point 88 common with lines 89, 90 connected respectively to the bases of NPN type transistors 92, 93. The emitter of transistor 92 is connected by a line 94 to a point d on the winding 80. The collector of this transistor extends to the electric motor 61 by a line 95. A diode 96 is connected in parallel with the transistor 92.

The emitter of the transistor 93 is connected to a point e on the secondary winding 80 by a line 97. The collector of this transistor is connected to the electric motor 61 by a line 98. A diode 99 is in parallel with the transistor 93. The operation of the motor 61 is improved by the provision of a capacitor 100 connected in parallel with the former.

The operation of the automatic focusing system according to the present invention is as follows:

With reference to FIG. 2 assume for the moment that the slide 50 in the projection gate has the transparency portion thereof perfectly planar and contained within the plane 102 defined by the cardboard or plastic mount portion 50a of the slide. Assume further that the lens holder 36 has been initially focused (moved relative to the frame 28) for sharply focusing the image on the slide 50. The bulb 46 will produce radiation which will be focused by the lens 47 downwardly to the mirror 48 where the beam will be reflected horizontally and at an angle with the optical axis 53. The beam 52 strikes the transparency at a point 103 spaced beneath the optical axis 53 in a vertical plane containing the same. The radiation beam 55 will be reflected for striking the combined prism and mirror assembly 56, whereupon the beam is reflected upwardly onto the photoelectric cell asssembly 58. Since the point 103 on the transparency is in the plane 102, i.e., perfectly focused, photosensitive elements 58a, 58b are equally illuminated and accordingly there will be no output from the photoelectric cell to the transistor 83. Therefore, motor 61 will not be engaged.

Now assume that the transparency portion 50b of the slide has buckled as shown in FIG. 2. The beam of radiation 52 now strikes the transparency at the point 104 causing the reflected beam 55' to strike the photoelectric cell such that the photosensitive elements thereof are not equally illuminated. Assume that the photoelectric cell is illuminated such that the resistivity of photosensitive element 58a is less than 58b. Also assume that the polarity of winding 80 is such that point b is negative and point c is positive. In this instance, the base of transistor 83 is negatively biased with respect to its emitter, and therefore it is an "on" state since it is of the PNP type. This causes the base of transistor 93 to be connected to center tap a of winding 80. Since point a on winding 80 is positive with respect to point e and the emitter of transistor 93, the base of the latter will be positively biased to an "on" state as it is of the NPN type. This will complete the motor circuit as follows: line 94, diode 96. motor 61, line 98, transistor 93, and line 97. In the instance just described, it will be noted that transistor 92 and diode 99 were not participating.

When the polarity of winding 80 changes, but with the same condition on the photoelectric cell 58, diode 96 and transistor 93 will not be active. In this instance, the base of transistor 83 will be positively biased, and therefore this transistor will be in an "off" state. This in turn disrupts the base current of transistor 92, thereby preventing the flow of current to the motor. Accordingly, when the resistance of photosensitive element 58a is less than the resistance of photosensitive element 58b, motor 61 will be energized by half-wave rectified current for rotation in one direction.

In the instance just described, the motor 61 would be energized for shifting the frame 28 and the lens holder 36 to the left as viewed in FIG. 1, a distance corresponding to the distance between the points 103 and 104 as measured along the optical axis. When this shifting movement is completed, the photosensitive elements of the photoelectric cell will again be equally illuminated (since the automatic focusing system is repositioned upon movement of the frame 28) for de-energizing the motor 61.

Should the transparency portion 50b of the slide buckle in the other direction, i.e., to the other side of the plane 102, the operation of the automatic focusing system is the same, except for a different path of current in the circuit. Should the slide buckle in this outer direction, the resistivity of photosensitive element 58b will be less than the resistivity of photosensitive element 58a. When the polarity of winding 80 is such that end b is negative and end c is positive, the base of transistor 83 will be positively biased, and therefore the latter will be in an "off" state. Under these conditions, current will not flow to the motor 61.

However, when the polarity is reversed such that end b of the winding 80 is positive with respect to end c, the base of transistor 83 will be negatively biased, thereby turning the latter "on." This in turn will bias transistor 92 for turning the same "on." Current flow to the motor will be as follows: line 97, diode 99, motor 61, line 95, transistor 92, and line 94. Accordingly, motor 61 will be energized in the other direction by half-wave rectified current.

With reference to FIG. 2, it is important to note that the point 104 is spaced from the optical axis 53, along which axis the amount of buckling is usually the greatest. By contacting the transparency portion 50b away from the optical axis, such as at the point 104, average focusing is achieved as the point 104 more or less represents the average of the displacement measured between the plane 102 and the center point of the transparency 50b which is on the optical axis 53. It will be appreciated that when a slide buckles in the shape illustrated in FIG. 2, it is not possible to have each and every point of the transparency in perfect focus. According to present invention the average displacement is sensed and the objective lens shifted to bring an average displaced image area into focus. In prior art automatic focusing systems, displacement of the transparency is measured along the optical axis, and therefore only the center of the transparency, i.e., the point on the optical axis, is placed in proper focus. Actually, the present invention achieves focusing in much the same manner as focusing is achieved when the operator manually adjusts the lens holder 36. When the lens holder 36 is shifted manually, the human eye observes an average image area on the screen and the operator focuses for that area.

Preferably, the radiation beams 52, 55 are in a plane such that the point 104 will be located on a line intersecting the optical axis 53 and in substantial perpendicular relation with the latter and the plane containing beams 52, 55. This relationship is achieved in the embodiment shown for purposes of illustration. As noted in FIG. 3, the bulge or warp of the transparency portion 50b is substantially symmetrical with respect to a vertical plane containing the point 104 and making equal angles with the beams 52, 55. Therefore, displacement of the beams 52, 55' results primarily for displacement of the point 104 from the plane 102. Or in other words, beams 52, 55' are displaced from their initial positions in a parallel manner and without changing their inclination. Obviously, a change in inclination of the beam 55' would cause erroneous signals to be produced by the photoelectric cell assembly.

To understand the significance of this feature, assume for the moment that the beams 52 and 55 are contained in a vertical plane as indicated by the double prime form of numerals in FIG. 2. It will at once be appreciated that the transparency may be buckled such that the portion thereof struck by the beam 52' may not be symmetrical with respect to a horizontal plane containing the point 104 in which case, by reason of the laws of incidence and refraction, the beam 55" might be reflected such that it would not contact the prism and mirror assembly 56 or at least be substantially displaced and therefore the system would not operate properly and could become inoperative.

Returning now to FIG. 1, it will be realized that normally the transparency portion 50b of the slide is buckled such that it is necessary for the frame 28 to move only a short distance to achieve focusing. Energizing of the motor 61 causes rotation of the threaded shaft 68 which brings about shifting of the frame 28. This is because the shaft 68 is threadingly engaged in the sleeve 70 which cannot move axially by reason of engagement between the flanges 70a thereof and the spring arm 72. Should a transparency be buckled severely or ruptured, the frame 28 will not be shifted so far in either direction as to cause damage to any components of the drive mechanism. This is achieved by operation of the overriding clutch consisting of the catch surfaces on the sleeve 70 and on the two members 74, 75, which are rotated by the shaft 68. It will be appreciated that upon engagement of either of the sets of catch surfaces 70b, 74a, or 70b, 75a, the sleeve 70 will be caused to rotate along with the threaded shaft 68 and therefore further shifting of the frame 28 will be prevented.

I claim:

1. In a projector of the type having a projection gate and an objective lens defining the projector optical axis, the improved construction for automatically maintaining a fixed distance between said objective lens and a transparency in said gate comprising, a frame movably mounted by the projector and carrying said lens for shifting the latter axially of the optical axis in both directions, said objective lens also being shiftable relative to said frame for establishing a fixed distance between the former and a transparency in said gate, a light sensitive detection system carried by said frame and including motive means activated in either direction in response to buckling of a transparency from a fixed plane at said gate, a driven member carried by said frame for movement relative thereto and connected with said motive means for being driven thereby, and other means on the projector, including a member fixedly supported thereby, engaged with said driven member to cause shifting of the frame upon movement of the former.

2. The improved construction according to claim 1 further defined by, an overriding clutch comprising first and second means cooperating respectively with said driven member and said other means to limit the stroke of shifting movement of said frame.

3. The improved construction according to claim 1 further defined by, said driven member including a rotatably mounted threaded shaft extending in parallel relation with the optical axis, catch means mounted adjacent each end of said shaft for rotation therewith, said other means including an internally threaded sleeve threadingly engaged with said shaft intermediate the ends thereof, said fixedly supported member including a resilient arm, means on the sleeve engaged with said arm restraining the former against axial movement and yieldably restraining the sleeve against rotation, catch means on opposite ends of the sleeve and defining first and second sets of catches with the adjacent catch means on said shaft, engagement of said first or second sets of catches serving to cause rotation of the sleeve thereby preventing further shifting of said frame.

4. The improved construction according to claim 1 wherein said frame is movably mounted by a plurality of vertically disposed flexible members each having one end connected to the frame and the other end fixedly mounted by the projector.

5. The improved construction according to claim 4 wherein each of said flexible members comprises a metal strip disposed in a plane perpendicular to the optical axis.

6. In a projector of the type having a projection gate and an objective lens defining the projector optical axis, wherein an automatic focusing system shifts said objective lens axially of the optical axis to maintain a fixed distance between the objective lens and a transparency in the gate, the improvement comprising, a frame and first means mounting the same for shifting movement axially of the optical axis in both directions, which frame supports said lens for shifting movement therewith, second means mounting the lens for movement relative to the frame for establishing a fixed distance between the former and a transparency in the gate, a light sensitive detection system including means mounted on said frame to shift the latter in response to buckling of a transparency from a fixed plane at the gate thereby to maintain said fixed distance, said first means including a plurality of vertically disposed flexible members each having one end connected to the frame and the other end fixedly mounted by the projector.

7. The improvement according to claim 6 wherein each of said flexible members comprises a metal strip disposed in a plane perpendicular to the optical axis.

8. In a projector of the type having a projection gate and an objective lens defining the projector optical axis, the improved construction for automatically maintaining a fixed distance between said objective lens and a transparency in the gate comprising, a frame mounted by said projector for shifting movement axially of the optical axis, said lens being carried by said frame, means for moving said lens relative to said frame for establishing a fixed distance between said lens and said transparency, first means on said frame for producing a beam of radiation and for directing the same in a first plane perpendicular to the optical axis, second means on said frame in spaced relation from the optical axis and positioned in said first plane for intersecting said beam thereby to reflect the same in a second plane perpendicular to the first plane and such that the reflected beam is focused upon said transparency at a point spaced from the optical axis, radiation sensitive means and third means on said frame, which third means intercepts the beam reflected from said transparency and directs the same in a third plane parallel with said first plane and onto the radiation sensitive means, said radiation sensitive means being responsive to displacements of the reflected beam thereon for producing signals, fourth means responsive to said signals and including motive means mounted on said frame for shifting the latter thereby to maintain a fixed distance between said lens and said point on the transparency.

9. The improved construction according to claim 8 wherein said second means is arranged such that the reflected beam is focused upon said transparency at a point spaced from the optical axis along a line intersecting the latter and being substantially perpendicular to the same and to said second plane.

10. The improved construction according to claim 8 further defined by, a driven member on the frame for movement relative thereto and connected with said motive means for being driven thereby, and other means on the projector, including a member fixedly supported thereby, engaged with said driven member to cause shifting of the frame upon movement of the former.

11. The improved construction according to claim 10 further defined by, an overriding clutch comprising first and second means cooperating respectively with said driven member and said other means to limit the stroke of shifting movement of said frame.

12. In an automatic focusing system for an image projecting device of the type including a projection gate and a movably mounted objective lens defining the projector optical axis, first means for producing a beam of radiation and for focusing the same upon an image transparency in said gate such that the beam is reflected obliquely therefrom, second means for focusing the reflected beam on radiation sensitive means responsive to displacements of the reflected beam thereon for producing signals, third means responsive to said signals and including motive members connected to said objective lens for moving the same and at least a portion of one of the aforesaid means therby to maintain a fixed distance between the lens and the portion of the transparency struck by the first mentioned beam and to reposition the reflected beam on said radiation sensitive means, the improvement comprising, said first means including an element focusing said beam of radiation onto said image transparency only at a point thereon which is spaced from the projector optical axis irrespective of the configuration assumed by the transparency upon buckling thereof, said first and second means directing said first mentioned beam and said reflected beam in a common plane perpendicular to a line passing through said point, such line intersecting the optical axis at a substantially right angle therewith.

References Cited
UNITED STATES PATENTS

| | | | |
|---|---|---|---|
| 2,947,215 | 8/1960 | Mitchell | 353—101 |
| 3,037,423 | 6/1962 | Shurcliff | 353—101 |
| 3,249,001 | 5/1966 | Stauffer | 353—101 |
| 3,249,007 | 5/1966 | Stauffer | 353—101 |
| 3,264,935 | 8/1966 | Vose | 353—69 X |
| 3,342,102 | 9/1967 | Maxon | 353—69 |

JOHN M. HORAN, Primary Examiner

R. M. SHEER, Assistant Examiner

U.S. Cl. X.R.

352—140